June 18, 1940.　　　A. PARTIN　　　2,205,151
TRAILER HITCH
Filed July 19, 1939　　　2 Sheets-Sheet 2
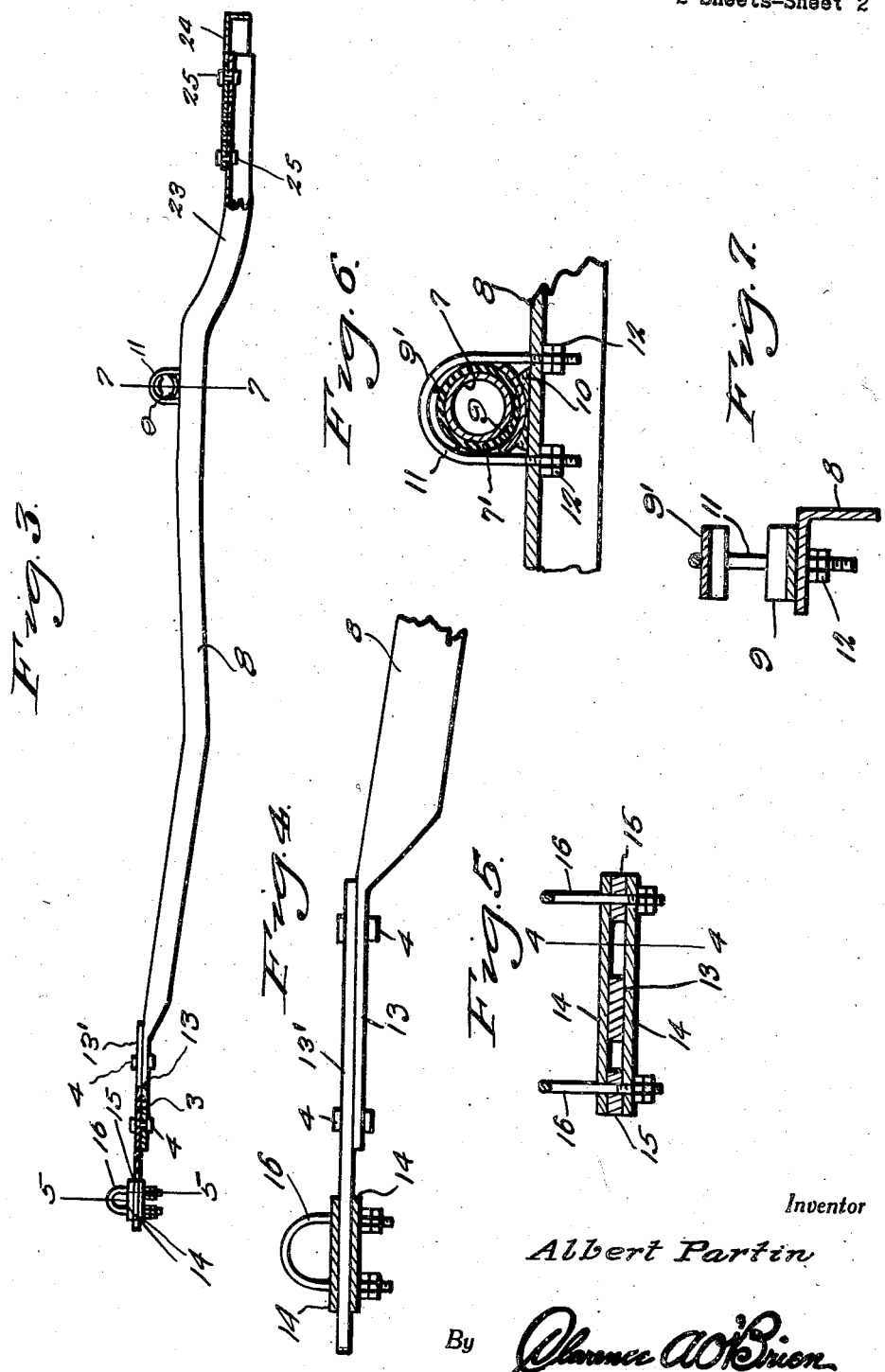
Inventor
Albert Partin
By Clarence A. O'Brien
and Hyman Berman
Attorneys Patented June 18, 1940

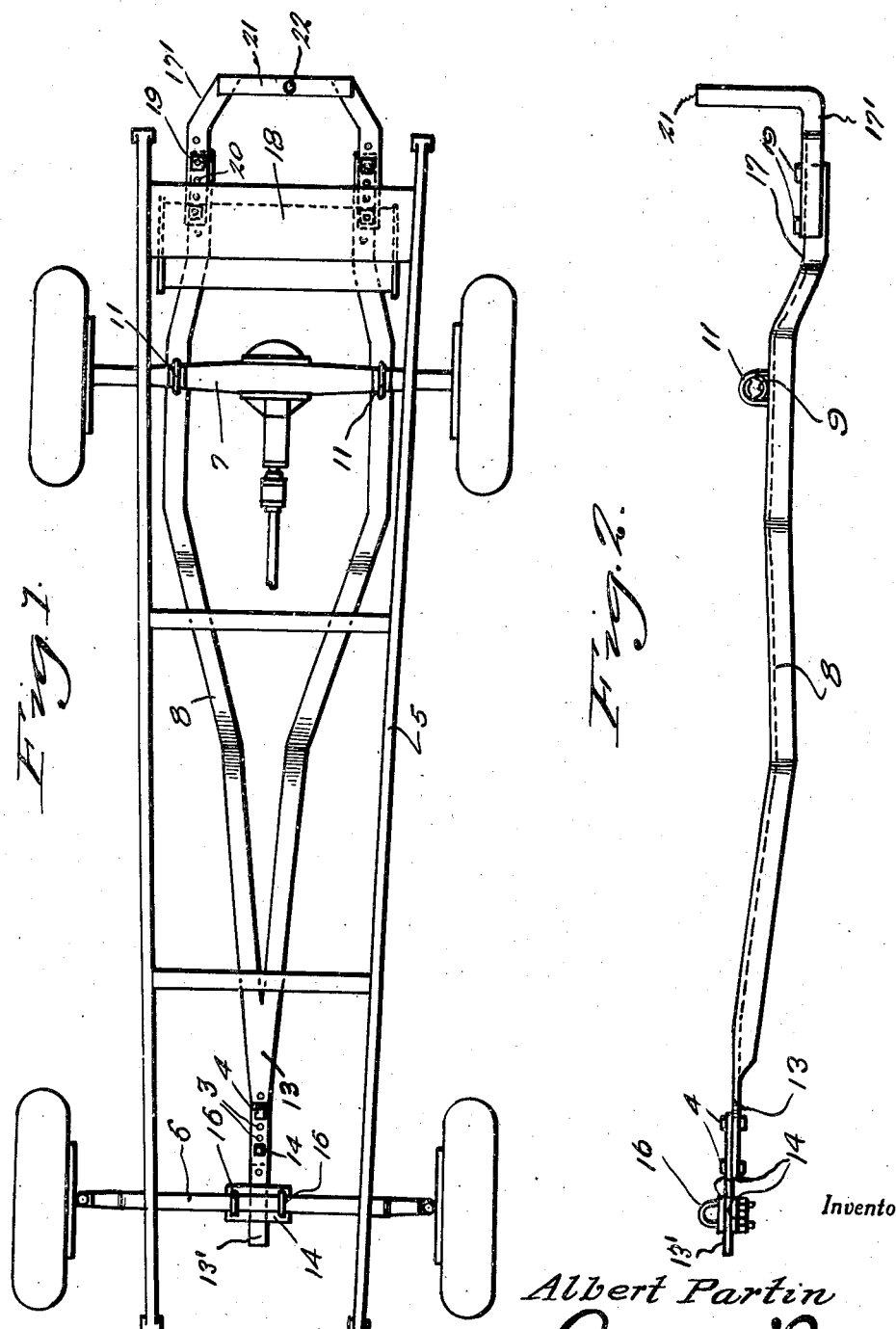

2,205,151

UNITED STATES PATENT OFFICE 2,205,151

TRAILER HITCH

Albert Partin, Portales, N. Mex.

Application July 19, 1939, Serial No. 285,394

3 Claims. (Cl. 280—33.44)

The present invention relates to a trailer hitch providing means for attaching the trailer to the axle of the pulling vehicle whereby to take the weight and rebound off of the rear springs of the pulling vehicle as well as to relieve the body of the pulling vehicle of the jolting action to which the same is usually subjected when the trailer is attached to the rear bumper or springs of the pulling vehicle.

More specifically the hitch comprises a pair of longitudinally extending members connected to the front and rear axles of the pulling vehicle and projecting rearwardly thereof to provide an attaching means at its rear end for the trailer.

An important object of the present invention is to provide a connection for the trailer hitch with the front axle of the pulling vehicle to compensate for any twisting movement subjected to the hitch at the rear axle, while at the same time providing a rigid support for the front end of the hitch.

A further object to provide a device of this character of simple and practical construction, which is strong and durable, relatively inexpensive to manufacture and install in operative position and otherwise well adapted for the purposes for which the same is intended.

Other objects and advantages reside in the details of construction as more fully hereinafter described and claimed, reference being had to the accompanying drawings forming part hereof, wherein like numerals refer to like parts throughout and in which:

Figure 1 is a top plan view of a vehicle chassis showing the trailer hitch secured in position thereto.

Figure 2 is a side elevational view of the trailer hitch.

Figure 3 is a similar view with parts broken away and shown in section and embodying a modified construction.

Figure 4 is a sectional view taken substantially on a line 4—4 of Fig. 5.

Figure 5 is a sectional view taken substantially on a line 5—5 of Fig. 3.

Figure 6 is a fragmentary longitudinal sectional view of one of the longitudinal members and illustrating the clamp for the rear axle housing and Figure 7 is a transverse sectional view taken substantially on a line 7—7 of Fig. 3.

Referring now to the drawings in detail wherein for the purpose of illustration, I have disclosed a preferred embodiment of the invention the numeral 5 designates a vehicle chassis which includes the front axle 6 and the rear axle housing 7. The trailer hitch comprises a pair of longitudinally extending angle iron members 8, spaced apart adjacent their rear ends and each having a saddle plate 9 welded or otherwise secured to the upper surface of the angle iron as shown at 10 and adapted to form a seat for the rear axle housing 7. A U-bolt 11 extends over the axle housing with its ends projecting through the angle iron 8 and secured in position by nuts 12 whereby to clamp the angle iron members to the rear axle housing. A clamping plate 9' is interposed between the axle housing and the bight portion of the bolt 11 and between the axle housing and the plates 9' is a rubber collar 7'.

The front ends of the angle iron members 8 have their vertical webs removed and merge as shown at 13. An extension 13' has one end overlying the end 13 and is adjustably secured thereto by bolts 4 passing through longitudinally spaced openings 3. The other end of the extension is inserted between a pair of clamping plates 14—14. Adjacent the end of the plates are shims 15 positioned therebetween to maintain the same in spaced relation and inserted through the plates and the shims are U-bolts 16—16 for clamping the plate to the front axle 6.

As more clearly illustrated in Fig. 5 of the drawings the width of the extension 13' is less than the width of opening between the plates whereby to permit limited lateral shifting movement of the front end of the hitch in accordance with any twisting movement which might occur at the rear axle.

In the form of the invention illustrated in Figs. 1 and 2 of the drawings the angle members 8 of the hitch are curved downwardly as shown at 17 to underlie the fuel tank 18 and to the rear ends of the members 8 is secured a U-shaped extension 17' by means of bolts 19 inserted in openings 20. The bight portion of the extension 17' is bent upwardly and is connected by a cross member 21 having an opening 22 therein to accommodate the coupling of the trailer (not shown).

In the form of the invention illustrated in Fig. 3 of the drawings the rear ends of the angle members are curved downwardly as shown at 23 to underlie the fuel tank and are connected at their rear ends by the U-shaped extension 24 projecting rearwardly in a horizontal plane below the tank, and secured by the bolts 25.

The front extension 13' enables the necessary adjustment to secure the hitch to various types of vehicles having wheel-bases of varying lengths and the rear extension 17' provides for the rearward adjustment of the hitch to a desired position for connecting the trailer.

It is believed the details of construction and manner of use of the device will be readily understood from the foregoing without further detailed explanation.

What is claimed is:

1. A trailer hitch comprising a pair of angle iron members positioned longitudinally of the chassis of a vehicle, in transversely spaced relation, a cross member connecting the rear ends of said longitudinal members and adapted for attaching a trailer coupling thereto, means for securing the longitudinal members to the rear axle of the vehicle, said longitudinal members merging at their front ends and an attaching member for the front end of the longitudinal members carried by the front axle of the vehicle, said attaching member having a transversely extending aperture adapted for receiving and supporting said front end of the longitudinal members for limited free transverse movement.

2. A trailer hitch comprising a pair of angle iron members positioned longitudinally of the chassis of a vehicle, in transversely spaced relation, a cross member connecting the rear ends of said longitudinal members and adapted for attaching a trailer coupling thereto, means for securing the longitudinal members to the rear axle of the vehicle, said longitudinal members merging at their front ends, and a pair of vertically spaced plates secured to the front axle of the vehicle between which the front end of the merged longitudinal members is inserted for limited free transverse movement.

3. A trailer hitch comprising a pair of longitudinally extending members, means for securing the members adjacent their rear ends to the rear axle of a vehicle, the front ends of the members merging, an extension connected to the front end of said members and adapted for longitudinal adjustment, means for connecting the extension to the front axle of a vehicle and a longitudinally adjustable extension connected to the rear ends of said members.

ALBERT PARTIN.